June 16, 1931.  J. WEINBERGER  1,810,234
SYSTEM FOR OPTICALLY RECORDING PHONOGRAPH RECORDS
Filed Oct. 27, 1925
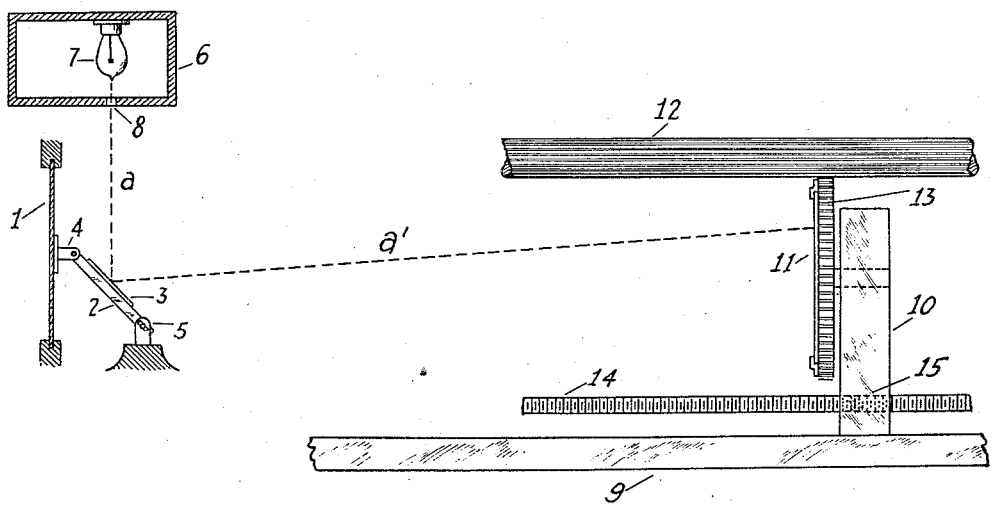
INVENTOR
JULIUS WEINBERGER
BY *Ira J. Adams*
ATTORNEY Patented June 16, 1931

1,810,234

UNITED STATES PATENT OFFICE

JULIUS WEINBERGER, OF NEW YORK, N. Y., ASSIGNOR TO RADIO CORPORATION OF AMERICA, A CORPORATION OF DELAWARE

SYSTEM FOR OPTICALLY RECORDING PHONOGRAPH RECORDS

Application filed October 27, 1925. Serial No. 65,134.

The invention concerns a system of recording phonograph records and has for its principal object to provide such a system which will register markings on a record corresponding faithfully and accurately to sound waves.

A further object of the invention is to provide a system for recording phonograph records making use of optical magnification.

It has been the custom heretofore to engrave phonograph records with a vibrating stylus whose vibrations are controlled either electrically or mechanically by the vibrations of a diaphragm responsive to the sound waves to be recorded. In either case, some method must be used for magnifying the movements of the diaphragm as these are ordinarily of too small amplitude to provide sufficient power for operating the engraving stylus. The mechanical systems usually make use of acoustical magnification, using resonant horns or resonant diaphragms, while the electrical systems ordinarily make use of vacuum tube amplifiers.

I have discovered that a very true and accurate record of sound waves can be obtained by using the principle of optical magnification. In this system, the recording diaphragm is connected to a small mirror in such a way that the movements of the diaphragm are transferred to the mirror. A beam of light is thrown on the mirror and reflected therefrom and the reflected beam will execute the motions of the mirror in magnified fashion. Owing to this optical magnification it is quite possible in this recording system to make use of recording apparatus having a very high natural frequency. Such a system can be made to respond with equal intensity to all frequencies within the audible range as owing to the optical magnification a very small movement of the diaphragm is sufficient to obtain the necessary movement of the beam of light to obtain a marking on the record of the required amplitude.

In using this system, the master record is treated with a light sensitive material which will undergo chemical changes under the action of light. The portions of the record which are subjected to the traveling beam will therefore be changed chemically while the unexposed portions will not be so changed. The sensitizing material should be of such a nature that the portions unaffected by light can be readily dissolved permitting the exposed portions to remain on the record. The record can then be put through an etching process whereby the portions subjected to the action of the beam of light will stand out clearly. This forms a master record from which other records may be made.

The invention is illustrated by way of example in the accompanying drawing in which the single figure represents diagrammatically a device for recording records according to the invention.

Referring to the drawing a recording diaphragm having a natural frequency above the range of audibility is shown at 1. A mirror 3 is mounted on a member 2 which is pivoted to the diaphragm at 4 and to a stationary support 5. Owing to this linkage mounting the mirror will move in accordance with the vibrations of the diaphragm 1. An electric light bulb 7 whose filament forms a point source of light is mounted in a box 6 which is entirely enclosed save for a small aperture 8 through which a beam of light $a$ is directed on the mirror 3. This beam of light reflected as at $a'$ will follow the movements of the mirror 3 and thereby execute the vibrations of the diaphragm 1 in magnified fashion.

The reflected beam of light is caused to describe a generally spiral path on the sensitized face of a record 11. The record 11 is fastened by any suitable means to the face of a circular plate 13 having gear teeth on its periphery and rotatably mounted on a traveling carriage 10. The gear teeth on the periphery of the circular plate 13 mesh with the gear teeth of an elongated gear 12. The carriage 10 is slidably supported on a support and guide 9 and is tapped as at 15 to receive a screw threaded rod 14. As the rod 14 is rotated the carriage 10 will be moved gradually toward the mirror 3 and as the gear 12 is rotated the record 11 fastened to the rotary plate 13 is caused to rotate. The combination of these 2 motions causes the reflected beam of light a' to trace a spiral path on the sensitized face of the record. As explained above the record can thereafter be treated and etched to obtain a clear and permanent record of the vibrations of the reflected beam of light which will give a faithful record of the sound waves impinging on the diaphragm 1.

While I have illustrated the invention in connection with a specific modification, it will be readily apparent to those skilled in the art that it can be carried out in many different ways.

I intend therefore to be limited only as indicated by the scope of the following claims:—

1. In an apparatus for recording sound waves a stationary point source of light, a relatively stationary reflector, for reflecting a ray of light from said source, arranged to be actuated at frequencies corresponding to those of the sound waves desired to be recorded, a rotatable disk, having a sensitized surface, and arranged with its axis in the general direction of said reflector, for intercepting the ray of light from said reflector, and means for moving said disk towards or away from said reflector, thereby causing said ray to trace a generally spiral path on said disk.

2. In a device of the character described, means for vibrating a ray of light, a disk of sensitized material with its axis in the line of said means, and arranged to intercept said vibrating ray of light, means for rotating said disk and means for varying the distance between said disk and said vibrating means.

3. In apparatus of the character described, a source of light, means for reflecting and vibrating a beam of light from said source, light sensitive material arranged to intercept said beam, means for varying the distance between said source and said light sensitive material, and means for giving another movement to said material other than the movement in the direction of the line between it and the means for reflecting the beam.

4. In combination, a point source of light; a mirror mounted so as to be vibrated, a diaphragm adapted to be vibrated by sound waves, linked to said mirror for the purpose of vibrating it, a circular plate having gear teeth on its periphery, a disc of sensitized material mounted on said plate, a carriage for said plate, a screw threaded rod for moving said carriage relative to said mirror, and an elongated gear meshing with the teeth on said plate, for rotating said plate.

JULIUS WEINBERGER.